United States Patent
McMahon

[11] 4,021,097
[45] May 3, 1977

[54] DISTRIBUTIVE TEE COUPLER

[75] Inventor: Donald H. McMahon, Carlisle, Mass.

[73] Assignee: Sperry Rand Corporation, New York, N.Y.

[22] Filed: Mar. 8, 1976

[21] Appl. No.: 664,727

[52] U.S. Cl. .............................. 350/96 C
[51] Int. Cl.² .......................... G02B 5/14
[58] Field of Search ............... 350/96 WG, 96 C

[56] References Cited
UNITED STATES PATENTS

| | | | |
|---|---|---|---|
| 3,777,149 | 12/1973 | Marcatili | 350/96 C |
| 3,905,676 | 9/1975 | Ulrich | 350/96 C |
| 3,933,410 | 1/1976 | Milton | 350/96 C |

Primary Examiner—John K. Corbin
Assistant Examiner—Stewart Levy
Attorney, Agent, or Firm—Howard P. Terry; Seymour Levine

[57] ABSTRACT

An optical coupling apparatus having first and second optical waveguides wherein optical signals are coupled therebetween in a distributive manner. The distributive coupling provides essentially equally distributed optical signals in the secondary guide while maintaining an essentially continuous flow of light in the primary guide.

9 Claims, 2 Drawing Figures

DISTRIBUTIVE TEE COUPLER

BACKGROUND OF THE INVENTION

1. Field of the Invention

The present invention relates to optical waveguide couplers and more specifically to a low loss optical waveguide tee coupler.

2. Description of the Prior Art

Multimode optical data links generally employ two types of terminal interconnect components: the tee coupler which provides a tap to the terminal from a common bus; and a star coupler which functions as a power splitter to distribute optical signals to terminals coupled directly thereto. Both systems suffer from light loss brought about by the coupling elements. Light loss suffered in coupling two terminals of a multi-terminal system wherein the terminals of the system are coupled by means of a star coupler varies linearly with the total number of interconnected terminals, while the worst case light loss suffered in coupling two terminals of a multi-terminal system, wherein the terminals of the system are coupled by means of a bus and a multiplicity of tee couplers employing three mixer rods, varies geometrically with the total number of interconnected terminals. Although the beneficial loss properties of star couplers are important for systems containing a larger number of terminals, the relative advantage becomes marginal for optical data links having a small number of terminals. Moreover, star couplers require the use of more cable than tee couplers thus introducing additional light loss and significantly increasing the cost of the over-all system. More recent prior art tee couplers have reduced the number of mixing rods from 3 to 1 with a concomitant decrease in the three port coupling loss of 2db. The improvement being realized by the utilization of only one mixer rod to equalize the energy distribution among the fibers of the bus.

The defect in all tee couplers is the inherent through put loss which results when mixer rods are utilized to equalize the distribution of energy among the fibers of the bus. Because the through put loss mounts geometrically as the number of tee connectors in the link increases, the through put loss represents the single most critical parameter of tee couplers. Tee couplers exhibit a minimum insertion loss, even with negligible coupling to the side arm, due to packing fraction losses in the tee coupler which result from the equalization of the optical signals across all the fibers in the trunk. The light loss characteristics of a multi-terminal system employing a common bus and tee couplers cannot be improved without eliminating these packing fraction losses while providing some means for equalizing the light energy distribution among the fibers of the bus.

SUMMARY OF THE INVENTION

The subject invention provides an improved tee coupler by utilizing a distributive coupling technique whereby some portion of the light is coupled into and out of all fibers of a bundle in parallel. Through put loss is minimized by fabricating the structure so that individual fibers of the bus remain unbroken within the tee thus eliminating packing fraction losses. This is achieved by removing a portion of the cladding from a single fiber or each fiber in a fiber bundle for a length determined by the degree of the coupling desired and making a permanent optical contact between the exposed fiber core and an external optical waveguide.

DESCRIPTION OF THE PREFERRED EMBODIMENT

Figure 1:
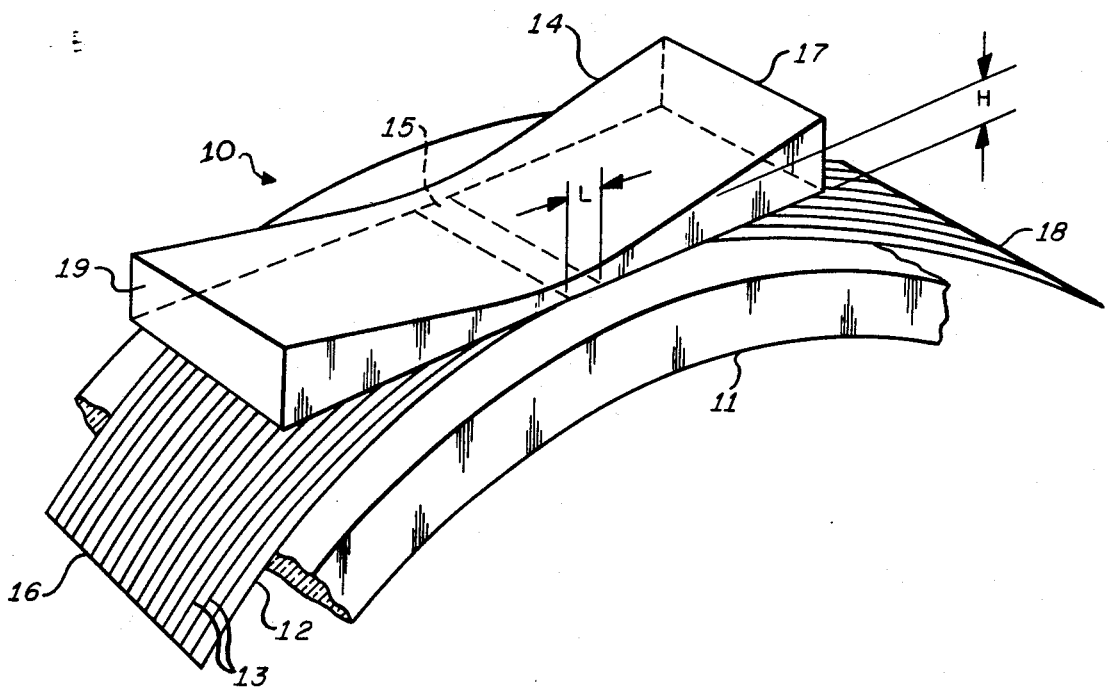
FIG. 1 is an illustration of an embodiment of the invention.
Figure 2:
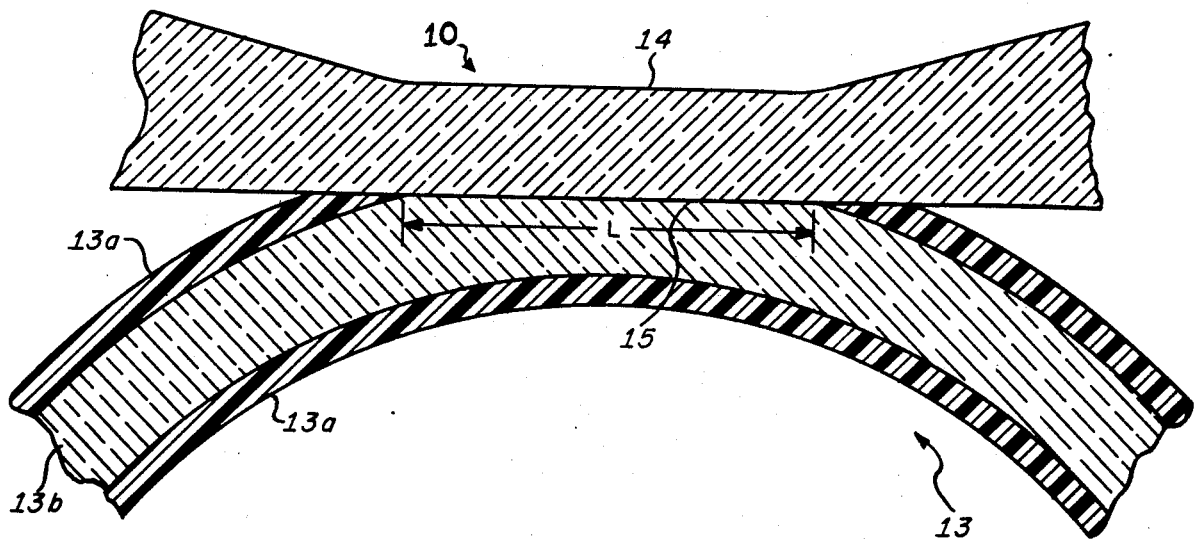
FIG. 2 is a cross-sectional view of the embodiment of FIG. 1.

Referring to FIGS. 1 and 2, a distributive tee coupler 10 includes a gently curved substrate 11 with an optical waveguide 12 permanently adhered thereto. The optical waveguide 12 comprises a multiplicity of light conducting fibers 13 disposed to lie in a plane, thus forming a ribbon, each fiber 13 including a core of light conducting material surrounded by a cladding material with an index of refraction less than the index of refraction of the core 13, thereby containing the propagating light within the core of the fiber 13. The cladding 13a is polished from one side of each of the fibers 13 for a short length L to form a coupling region 15. A slab 14 of light propagating material with refractive index essentially equal to or greater than the refractive index of the core 13b of the fiber 13 is coupled to the optical waveguide 12 at the coupling region formed by the removal of the cladding 13a. A cladding with a slightly lower index of refraction than the slab 14 material may be applied to the slab 14, which cladding may be removed in the coupling region 15 to increase the degree of coupling between the optical waveguides. In the coupling region 15 the slab 14 may have a thickness that is approximately equal to the diameter of the core 13b of the fiber 13 and a width that is approximately equal to the width of the fiber ribbon waveguide 12. The slab 14 may taper very gently from each end of the coupling region allowing for an increase in height H in the order of a millimeter for every ten centimeters of distance from the end of coupling region. This allows for the proper collimation of light in the optical waveguide formed by the slab 14 after coupling from the fiber ribbon waveguide 12.

Light incident to the fiber ribbon optical waveguide 12 is essentially equally distributed between the fibers 13 thereof. Coupling between the fiber ribbon optical waveguide 12 and the slab optical waveguide 14 is distributive. The fibers 13 of the fiber ribbon waveguide 12 are continuous and some portion of the light couples into and out of all the fibers 13 in parallel without major disruptions of the flow of light therein, providing for an essentially equal distribution of light in the fibers when coupling to the fiber ribbon 12 and for an essentially equal distribution in the slab 14 when coupling thereto. Light signals incident to port 16 of the fiber ribbon optical waveguide 12 couple to the slab optical waveguide 14 in the forward direction and propagate to port 17. When the index of refraction of the fiber core 13b and the slab material are essentially equal and the width of the slab 14 in the coupling region 15 is essentially equal to the diameter of the fibers, the coupler is reciprocal and light incident to port 17 will couple nearly equally to all the fibers 13 and propagate to port 16. Port 18 of the fiber ribbon optical waveguide 12 and port 19 of the slab optical waveguide 14 couple similarly. When the index of refraction of the slab material is greater than the index of refraction of the fiber core, a non-reciprocal coupler exists with appreciable coupling only from the fiber ribbon waveguide 12 to the slab waveguide 14.

While the invention has been described in its preferred embodiment, it is understood that the words which have been used are words of description rather than limitation and that changes may be made within the purview of the appended claims without departing from the true scope and spirit of the invention in its broader aspects.

I claim:

1. An optical coupling apparatus comprising:

a first optical waveguide having a multiplicity of light propagating fibers disposed to lie between parallel planes, establishing an over-all width therebetween, each fiber including a light propagating core, all of said cores having essentially equal refractive indexes and essentially equal heights with each core surrounded by a cladding for maintaining propagating light therewithin, portions of said cladding being removed for a predetermined length on each of said fibers to establish a coupling region such that said cores and remaining cladding are continuous therethrough;

a second optical waveguide having a coupling region coupled to said coupling region of said first optical waveguide, said coupling region possessing a length, width and height essentially equal to said length, width and height of said coupling region of said first waveguide, said coupling providing for a transfer of light energy between said first and second optical waveguides such that the light energy transferred is essentially equally distributed in the guide to which the light energy is transferred while continuous flow of essentially equally distributed light energy is mainained in the optical waveguide from which the light energy is transferred.

2. An optical coupling apparatus in accordance with claim 1 wherein said second optical waveguide is tapered along its length a given distance in each direction from said coupling region in an increasing manner.

3. An optical coupling apparatus in accordance with claim 2 wherein each of said tapers provides an increase in height for said second optical waveguide at said given distances from said coupling region that is small compared to said distances.

4. An optical coupling apparatus in accordance with claim 2 wherein said second optical waveguide possesses an index of refraction that is essentially equal to said index of refraction possessed by said cores of said optical fibers.

5. An optical coupling apparatus in accordance with claim 2 wherein said second optical waveguide possesses an index of refraction greater than said index of refraction possessed by said cores of said light propagating fibers.

6. An optical coupling apparatus in accordance with claim 2 further including a substrate whereon said first optical waveguide is permanently affixed.

7. An optical coupling apparatus in accordance with claim 6 wherein said substrate possesses a curvature with a radius large compared to said height of said core of said optical fiber.

8. An optical coupling apparatus in accordance with claim 7 wherein said second optical waveguide possesses an index of refraction that is essentially equal to said index of refraction possessed by said cores of said light propagating fibers.

9. An optical coupling apparatus in accordance with claim 7 wherein said second optical waveguide possesses an index of refraction that is greater than said index of refraction possessed by said cores of said light propagating fibers.

* * * * *